(12) United States Patent
De La Place

(10) Patent No.: US 8,978,179 B2
(45) Date of Patent: Mar. 17, 2015

(54) BED COVER

(71) Applicant: St. Geneve Fine Bedlinens Ltd., Richmond (CA)

(72) Inventor: Michael Paul De La Place, Richmond (CA)

(73) Assignee: St. Geneve Fine Bedlinens Ltd., Richmond, British Columbia ( * ) Notice: Subject to any disclaimer, the term of this patent is extended or adjusted under 35 U.S.C. 154(b) by 0 days.

(21) Appl. No.: 14/197,553

(22) Filed: Mar. 5, 2014

(65) Prior Publication Data

US 2014/0250596 A1 Sep. 11, 2014

Related U.S. Application Data

(60) Provisional application No. 61/773,017, filed on Mar. 5, 2013.

(51) Int. Cl.
*A47G 9/02* (2006.01)
*A47G 9/00* (2006.01)
*A01K 13/00* (2006.01)

(52) U.S. Cl.
CPC ............ *A47G 9/0207* (2013.01); *A47G 9/0223* (2013.01); *A01K 13/008* (2013.01)
USPC ....................................... 5/502; 5/486; 5/482

(58) Field of Classification Search
CPC .... A47C 31/105; A47C 31/10; A47C 27/002; A47G 9/00; A47G 9/02; A47G 9/0207; A47G 9/0215; A47G 9/0223; A47G 9/0238; A47G 9/0261

USPC ............................. 5/502, 500, 499, 486, 482
See application file for complete search history.

(56) References Cited

U.S. PATENT DOCUMENTS

| | | | | |
|---|---|---|---|---|
| 5,044,032 A | * | 9/1991 | Tesch | 5/502 |
| 5,243,725 A | * | 9/1993 | Fowler | 5/502 |
| 5,408,712 A | * | 4/1995 | Brun | 5/502 |
| 2014/0250596 A1 | * | 9/2014 | De La Place | 5/502 |

FOREIGN PATENT DOCUMENTS

| | | | | |
|---|---|---|---|---|
| EP | 78691 A1 | * | 5/1983 | A47G 9/02 |
| GB | 2159050 A | * | 11/1985 | A47G 9/02 |
| WO | WO 9218036 A1 | * | 10/1992 | A47G 9/02 |
| WO | WO 2005016082 A1 | * | 2/2005 | A47G 9/02 |

* cited by examiner

*Primary Examiner* — Robert G Santos
(74) *Attorney, Agent, or Firm* — McCormick, Paulding & Huber LLP

(57) ABSTRACT

The present disclosure provides at least in part a bed cover comprising a plurality of heat insulating chambers having a first surface and a second surface and at least two sidewalls connecting the first surface and the second surface, the width of said first surface being greater than the width of said second surface; a plurality of heat conduits between the sidewalls of the heat insulating chambers, said heat conduits having an open and a closed position; wherein each heat insulating chamber is hingeably connected to at least one adjacent heat insulating chamber, such that the heat conduits may open and close as adjacent heat insulating chambers flex towards or away from each other.

20 Claims, 2 Drawing Sheets

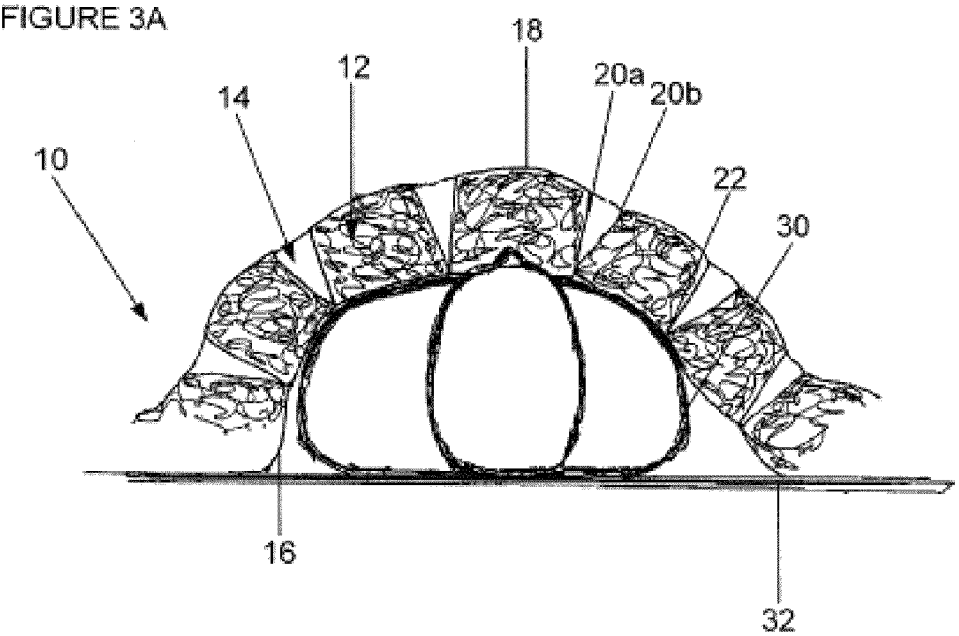
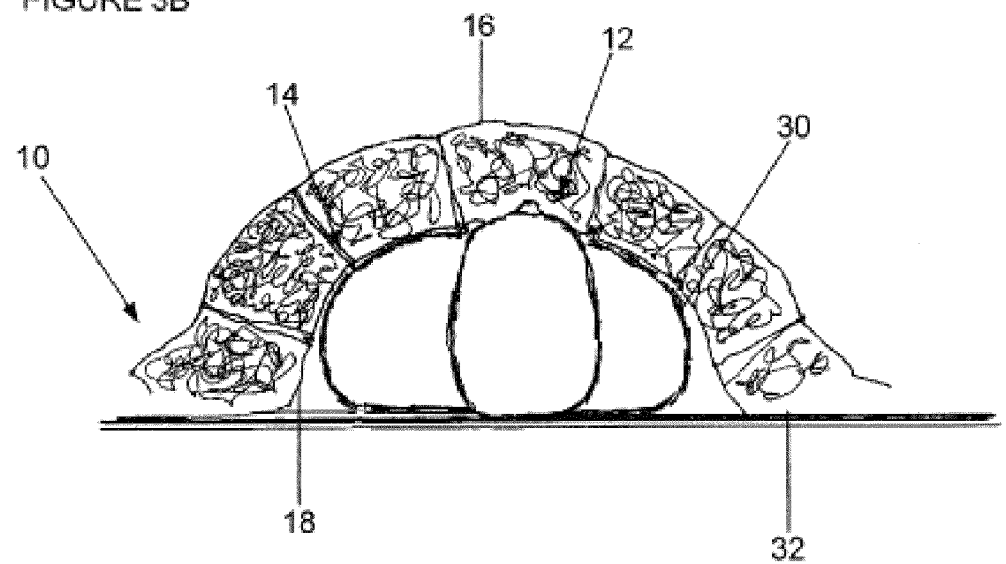

BED COVER

CROSS-REFERENCE TO RELATED APPLICAITONS

This application claims the benefit of and priority to U.S. Patent Application Ser. No. 61/773,017, filed Mar. 5, 2013, the content of which is incorporated by reference.

TECHNICAL FIELD

The present disclosure relates to a bed cover. Embodiments of the present disclosure provide a bed cover with a warm and a cool orientation.

BACKGROUND

Bed covers, particularly blankets, duvets and quilts are used to provide comfort, protection, and/or warmth. Typically, such articles create a zone between the body and the surrounding air which impedes an exchange of heat between the body and the surroundings and thereby reduce the radiation and dissipation of heat from the human body.

Depending on certain factors such as, for example, the ambient temperature, it may be desired that more or less of the heat produced by the human body escape through a bed cover.

If the ambient temperature is low and the heat gradient is thus relatively high then the bed cover might preferably retain more of the heat produced by the body. If, on the other hand, the ambient temperature is relatively high then it may be desired that more heat be carried away from the body.

It is known to use different bed covers in the summer compared to those used in the winter. Bed covers for the winter, for example, are designed in such a way that they retain or maintain (sometimes referred to as "thermal maintenance") the heat of the human body to a higher extent than bed covers for the summer. Bed covers for the winter generally are thicker and or have a more dense filling material than bed covers for the summer.

In the summer, a winter bed cover could be too warm and provide more thermal maintenance than is required or desired. Body heat builds up under the bed cover since the heat produced by the body is not carried away due to the low heat conductivity and the relatively low temperature drop from under the bed cover to the ambient environment. Bed covers for the summer are therefore generally lighter and less dense that bed covers for the winter. They also generally have a higher number of thermal bridges that permit the body heat to pass through the bed cover and dissipate. They therefore generally provide a lower degree of thermal maintenance compared to a winter bed cover.

In certain circumstances it may be desired to provide a single bed cover with warmer and cooler zones. For example, if one bed partner prefers to be warmer while the other prefers to be cooler it would be advantageous to provide a bed cover which can accommodate both partners.

It is known to use a summer bed cover for the summer months and a winter bed cover when it gets colder. In these circumstances, the bed cover not being used must be stored which is inconvenient and uses up storage space. It is also more expensive and consumes more resources to obtain two bed covers rather than just one.

It is also known to use a bed cover system where several individual bed covers can be combined into one overall bed cover which is thicker for the winter. For example, duvets are available with specific insulation values. Lower values being suitable for summer use and higher values for winter use, each duvet having only one insulation value and the user combines the two duvets by laying one over the other. This arrangement is inconvenient and the winter bed cover is heavier and less comfortable to sleep under.

It is also known to use an adjustable bed cover that involves adjustable straps or cords to adjust the alignment of insulating units in the bed cover to modify the overall thermal insulation of the bed cover. Also known is a reversible bed cover that has a flat sheet with heat insulating panels protruding off from the flat sheet, wherein the thermal insulation of the bed cover can be altered by turning the bed cover over so that the insulating panels face downwards towards the human body. See for example, WO 92/18036, U.S. Pat. No. 5,044,032 and WO 2005/016082 A1.

SUMMARY

The present disclosure provides at least in part a bed cover comprising a plurality of heat insulating chambers having a first surface and a second surface and at least two sidewalls connecting the first surface and the second surface, the width of said first surface being greater than the width of said second surface; a plurality of heat conduits between the sidewalls of the heat insulating chambers, said heat conduits having an open and a closed position; wherein each heat insulating chamber is hingeably connected to at least one adjacent heat insulating chamber, such that the heat conduits may open and close as adjacent heat insulating chambers flex towards or away from each other.

The present disclosure relates to a bed cover with a heat maintaining winter orientation and a summer cooling orientation.

This summary does not necessarily describe all features of the invention. Other aspects, features and advantages of the invention will be apparent to those of ordinary skill in the art upon review of the present description of specific embodiments of the invention.

BRIEF DESCRIPTION OF THE DRAWINGS

In the accompanying drawings, which illustrate one or more exemplary embodiments:

FIG. 3A is a cross-section of the bed cover of FIG. 1 draped over a human body.

FIG. 3B is a cross-section of the bed cover of FIG. 1 draped over a human body.

DETAILED DESCRIPTION

Directional terms such as "top", "bottom", "left", "right", "front", and "rear" are used in the following description for the purpose of providing relative reference only, and are not intended to suggest any limitations on how any article is to be positioned during use, or to be mounted in an assembly or relative to an environment.

The present disclosure relates to a bed cover with a heat maintaining orientation and a second orientation with reduced heat maintenance.

The present disclosure relates to a bed cover such as, for example, a duvet, quilt, comforter, or blanket or any other suitable form of bed cover.

Figure 1:
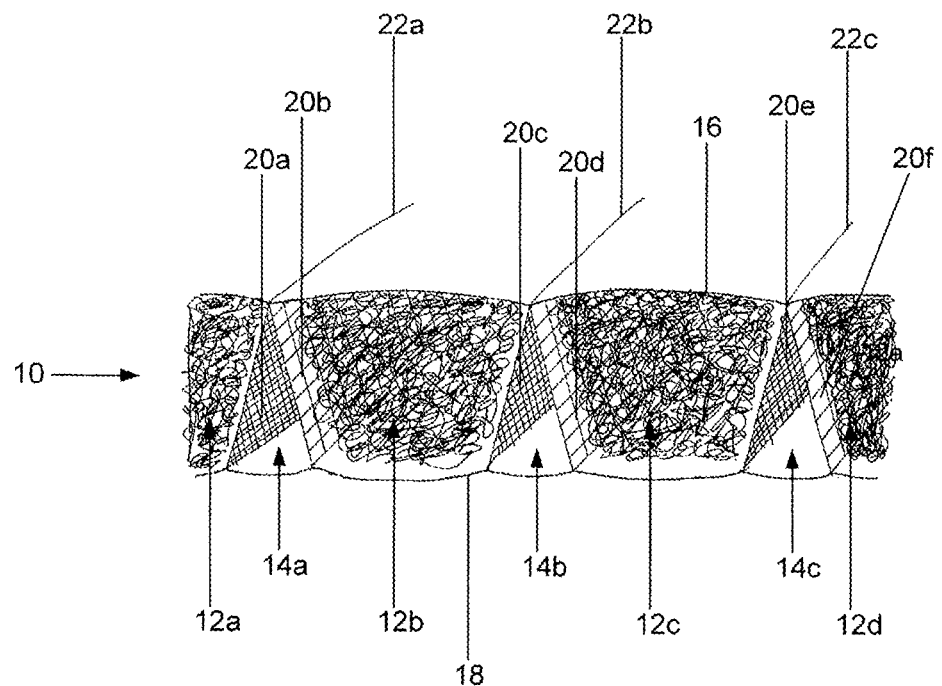
FIG. 1 is a perspective view of a cross-section of part of a bed cover, according to one embodiment.

Referring now to FIG. 1, the present disclosure provides at least in part a bed cover 10 having a first surface 16 and a second surface 18. The first surface 16 may comprise a single unitary piece or may comprise multiple pieces. The second surface 18 may comprise a single unitary piece or may comprise multiple pieces. In the embodiment shown in FIG. 1, the first surface 16 runs along the upper side of the bed cover 10 and the second surface 18 runs along the lower side of the bed cover 10.

The first surface 16 and the second surface 18 are connected by a plurality of sidewalls 20a, 20b, 20c, 20d, 20e and 20f (altogether side walls 20a, 20b, 20c, 20d, 20e and 20f are referred to as "the sidewalls 20"). The first surface 16, the second surface 18 and the sidewalls 20 partition the bed cover 10 into heat insulating chambers 12a, 12b, 12c, and 12d (altogether heat insulating chambers 12a, 12b, 12c, and 12d are referred to as "the heat insulating chambers 12"). FIG. 1 only shows a cross-section of a part of the bed cover 10 and the bed cover 10 can be of any appropriate size for the intended use.

As shown in FIG. 1, the first surface 16 of each heat insulating chamber 12 is wider than the second surface 18 of the same heat insulating chamber 12. As a result of the different widths, the sidewalls 20 of different heat insulating chambers 12 slope away from one another. The cross-sectional shape of the heat insulating chambers 12 shown in FIG. 1 is an isosceles trapezoid. Other shapes are also suitable for the heat insulating chambers 12 including, but not limited to, trapezoids, parallelograms and other suitable three-dimensional rectilinear bodies.

The different widths of the first surface 16 and second surface 18 of the heat insulating chambers 12 creates, in the embodiment shown, heat conduits 14a, 14b, and 14c (altogether heat conduits 14a, 14b, and 14c are referred to as "heat conduits 14") in the bed cover 10. As will be discussed in more detail below, in the present embodiment, the second surface 18 also covers at least a part of the aperture of the heat conduits 14.

In FIG. 1, the first surface 16 is a continuous sheet of material and is divided up into partitions that comprise the upper side or edge of each heat insulating chamber 12. In FIG. 1, seams 22a, 22b and 22c (altogether seams 22a, 22b, 22c are referred to as the "seams 22") are orientated along the longitudinal length of the bed cover 10 and seal the edges of the heat insulating chambers 12 of the bed cover 10. At each seam 22, the material of the first surface 16 is connected to a sidewall 20 of one heat insulating chamber 12 and a sidewall 20 of an adjacent heat insulating chamber 12. The connection may be through any suitable means such as, for example, a stitched seam or adhesive or Velcro™ or any other form of connection including clips or plugs.

The seams 22 connect the sidewalls 20 to the first surface 16 and form a connection about which the two sidewalls 20 can flex. In FIG. 1, the heat conduits 14 are shown in an "open" position. In the open position, as the sidewalls 20 extend away from the seams 22, they become further apart and form an aperture. As will be discussed later, the heat conduits 14 form an area of the bed cover that has reduced thermal maintenance and permits heat to more freely pass across the bed cover 10 when compared to the passage of heat across the heat insulating chambers 12.

In FIG. 1 the distal ends of the sidewalls 20 are connected to the second surface 18. The connection may be via any suitable means such as, for example, a stitched seam, adhesive or Velcro®. The length of the second surface 18 that covers the aperture of the heat conduits 14 may be used to control the extent to which the aperture of the heat conduits 14 open. When the material of the second surface 18 bridging the heat conduits 14 is stretched to its fullest, the heat conduits 14 cannot open any further.

The first surface 16 and the second surface 18 can be continuous along the edge of the bed cover 10 and the bed cover 10 of the present embodiment therefore resembles, in appearance, common bed covers shapes and styles.

Figure 2:
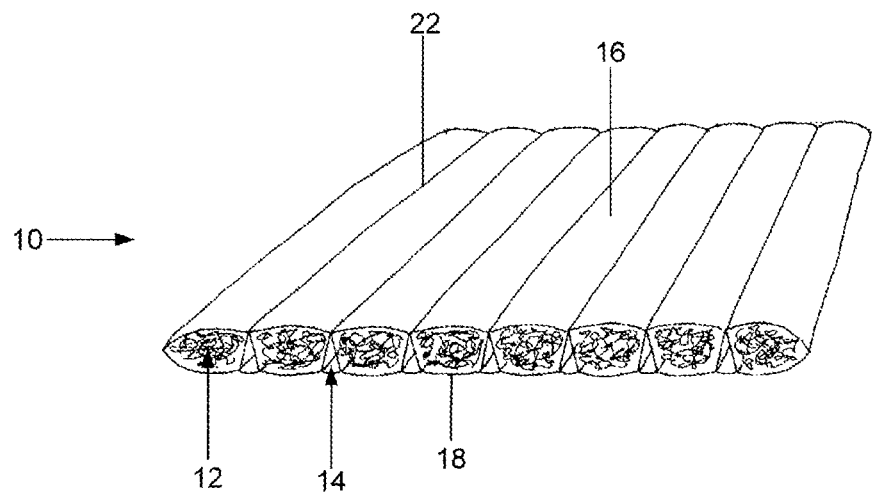
FIG. 2 is a perspective view of a cross-section of the bed cover of FIG. 1.

As can be seen from FIG. 2, the lateral edges of the bed cover 10 are defined by heat insulating chambers 12. The heat insulating chambers 12 at the edges of the bed cover 10 are, because of their position, connected by seams 22 to only one other heat insulating chamber 12. The heat insulating chambers 12 in the bed cover 10 that are not on the edges are each coupled with a heat insulating chamber 12 on either side of them.

In FIGS. 1 and 2, the bed cover 10 is formed of a repeating series of alternating heat insulating chamber 12, heat conduit 14 and then heat insulating chamber 12 and so on. The heat insulating chambers 12 are tube-like structures (with the particular rectilinear cross-sections shapes discussed above) and extend along the longitudinal length of the bed cover 10 or substantially the length of the bed cover 10. In a similar fashion the heat conduits 14 form a series of grooves or channels along the longitudinal length of the bed cover 10.

In certain embodiments, the heat insulating chambers 12 are filled with a filling material such as down, silk, feathers, fibres, beads, clusters or swab or a mixture of these materials or any other suitable filling material. These filling materials can provide a thermal insulating or maintaining property to the heat insulating chambers 12. The thickness of the heat insulating chambers 12 may vary and will partly determine the extent to which the heat is retained or lost during use.

In certain embodiments, the filling material in the heat insulating chambers 12 can be of relatively consistent thickness and density so that the heat insulating chambers 12 in the bed cover 10 provide the same thermal maintenance across the entire bed cover 10. In other embodiments the filling material may be varied to provide different insulating properties in different areas of the bed cover. As will be described below, the variation in the thermal maintenance of the bed cover 10 may be provided by altering or varying the configuration of the heat conduits 14.

In their open configuration the present heat conduits 14 provide thermal channels that permit heat to escape through the bed cover and into the environment. The heat radiates through the open heat conduits 14 faster than it does through the heat insulating chambers 12. As the open heat conduits 14 have a lower thermal resistance than the heat insulating chambers 12, they tend to dissipate heat more quickly from the human body than the heat insulating chambers 12.

As can be seen in FIGS. 1 and 2, the heat conduits 14 may be bridged by the second surface 18. The second surface 18 in this embodiment is a thin or lightweight material such as, for example, cotton or silk which has limited thermal maintenance properties but is included to give the bed cover 10 a desirable appearance and to give the bed cover 10 a more comfortable feel to the human body sleeping under it. The material covering the aperture of the heat conduits 14 preferably does not significantly alter the capability of the open conduits to permit heat to escape through the bed cover 10.

In certain embodiments, the orientation and configuration of the heat insulating chambers 12 and the heat conduits 14, and the cross-sectional shape of the heat insulating chambers 12, produce a bed cover 10 that has different thermal maintenance capabilities depending on which side of the bed cover 10 is facing the external environment.

In FIG. 3A, there is shown a human body 30 (head, shoulders and nose) lying on a mattress 32. The human body 30 is facing upwards away from the mattress 32. Draped over the human body 30 is at least part of a bed cover 10. Note that FIG. 3A and 3B are not necessarily drawn to scale.

In FIG. 3A, the first surface 16 of the bed cover 10 is in contact with the human body 30. In this orientation, the second surface 18 faces upwards towards the external environment. In this configuration, the second surface 18 has a greater circumference than the first surface 16 and therefore has a larger distance to travel around the human body 30 than the first surface 16. In this configuration, the heat conduits 14 are pulled "open" by the higher tension on the second surface 18 compared to the first surface 16. While not wishing to be bound by theory, the heat conduits 14 are opened because the larger circumference of the second surface 18 pulls the second surface 18 more than the material of the first surface 16 is pulled. This causes the distal ends of the sidewalls 20a and 20b to be pulled apart and flex relative to each other from the seam 22. As described above, the extent to which the heat conduits 14 may be opened depends to a certain extent on the length of the second surface 18 that covers or bridges the aperture of the heat conduits 14. The longer the length of material bridging the heat conduits 14, the further the heat conduits 14 may open up to a maximum opening dimension which is dictated by the contours of the human body 30.

In FIG. 3A, while the thermal resistance of the heat insulating chambers 12 remains relatively constant, the thermal maintenance of the heat conduits 14 in the open position is much lower. The grooves and channels created by the heat conduits 14 along the longitudinal length of the bed cover 10 permit heat to pass through the bed cover 10 and escape into the external environment. The configuration of the bed cover 10 shown in FIG. 3A is therefore referred to as the "summer side" of the bed cover 10.

In FIG. 3B, the second surface 18 is in contact with the human body 30 while the first surface 16 faces upwards towards the external environment. In FIG. 3B, the heat conduits 14 are shown in a "closed" position. In this embodiment, the first surface 16 has the greater circumference and the longer distance to travel than the second surface 18. The first surface 16 is under a greater tension than the second surface 18.

Without wishing to be bound by theory, the closing of the heat conduits 14 in the configuration in FIG. 3B occurs because of the larger circumference of the first surface 16 combined with the shape of the heat insulating chambers 12. The shape of the heat insulating chambers 12 where the first surface 16 is wider than the second surface 18, in combination with the greater tension on the first surface 16, pulls the heat conduits 14 into at least a partially closed position.

When the heat conduits 14 are at least partially closed or substantially closed the thermal maintenance of the heat conduits 14 is increased compared to when they are open and the heat is less able to escape through the bed cover 10 to the external environment. In this configuration, the bed cover 10 provides an enhanced thermal maintenance compared to the configuration in FIG. 3A.

The overall thermal maintenance of the bed cover 10 will depend at least in part on the fraction of the heat conduits 14 that are open and the degree to which they are open. As the heat conduits 14 provide the lowest thermal maintenance they affect the overall insulation of the bed cover 10 since heat will move across the bed cover 10 in response to the temperature differential between under the bed cover 10 and outside of the bed cover 10. So the area of heat conduits 14 as a fraction of the overall bed cover 10 area will have an effect on the mean thermal maintenance of the bed cover 10.

The bed cover 10 of a preferred embodiment is capable of providing different degrees of thermal maintenance depending on how the person wishes to use it. When the bed cover 10 is used in either orientation, the thermal maintenance will be higher or lower depending on which side faces outward. Accordingly, the user need only turn over the bed cover 10 to obtain additional or reduced thermal maintenance.

The dual season bed cover described above is not restricted to bed covers but can be applied also to other suitable items such as, for example, sleeping bags. For example the upper part or the whole of a sleeping bag may be configured according to the present disclosure. Embodiments of the present disclosure may be used for animals other than humans such as horse blankets and dog blankets.

The present invention has been described with regard to preferred embodiments. However, it will be obvious to persons skilled in the art that a number of the variations and modifications can be made without departing from the scope of the invention described herein. Examples of such modifications include the substitution of known equivalents for any aspect of the invention in order to achieve the same result in substantially the same way. It is contemplated that any embodiment or aspect discussed in this specification can be implemented or combined with respect to any other embodiment, method, composition or aspect of the invention, and vice versa.

All citations are herein incorporated by reference, as if each individual publication was specifically and individually indicated to be incorporated by reference herein and as though it were fully set forth herein. Citation of references herein is not to be construed nor considered as an admission that such references are prior art to the present invention.

What is claimed is:
1. A bed cover comprising:
 (a) a plurality of heat insulating chambers having a first surface and a second surface and at least two sidewalls connecting the first surface to the second surface, the width of said first surface being greater than the width of said second surface;
 (b) at least one bridge connecting adjacent sidewalls of adjacent heat insulating chambers, each bridge of the at least one bridge and the adjacent sidewalls defining a heat conduit therebetween, said heat conduit having an open and a closed position;
 wherein each heat insulating chamber is hingeably connected to at least one adjacent heat insulating chamber, such that each heat conduit closes or opens as adjacent heat insulating chambers flex towards or away from each other.

2. The bed cover according to claim 1, wherein the heat insulating chambers are hingeably connected at or close to the first surface.

3. The bed cover of claim 1, wherein the plurality of heat insulating chambers are in a series parallel to a side of the bed cover.

4. The bed cover of claim 1, wherein the heat insulating chambers have a substantially trapezoid cross-sectional shape.

5. The bed cover of claim 1, wherein the heat insulating chambers have a substantially isosceles trapezoid cross-sectional shape.

6. The bed cover of claim 1, wherein the sidewalls of each heat insulating chamber are connected to the second surface.

7. The bed cover of claim 1, wherein the heat conduits form a series of triangular shaped grooves parallel to a side of the bed cover.

8. Use of a bed cover according to claim 1, wherein the bed cover provides two different thermal maintenance values.

9. Use of a bed cover according to claim 1, wherein the first surface of the bed cover provides a higher degree of thermal maintenance than the second surface.

10. Use of a bed cover according to claim 1, wherein the second surface of the bed cover provides a lower degree of thermal maintenance than the first surface.

11. A method of manufacturing a bed cover according to claim 1.

12. The bed cover of claim 2, wherein the plurality of heat insulating chambers are in a series parallel to a side of the bed cover.

13. The bed cover of claim 2, wherein the heat insulating chambers have a substantially trapezoid cross-sectional shape.

14. The bed cover of claim 3, wherein the heat insulating chambers have a substantially trapezoid cross-sectional shape.

15. The bed cover of claim 2, wherein the heat insulating chambers have a substantially isosceles trapezoid cross-sectional shape.

16. The bed cover of claim 3, wherein the heat insulating chambers have a substantially isosceles trapezoid cross-sectional shape.

17. The bed cover of claim 4, wherein the heat insulating chambers have a substantially isosceles trapezoid cross-sectional shape.

18. The bed cover of claim 2, wherein the sidewalls of a heat insulating chamber are connected to the second surface.

19. The bed cover of claim 3, wherein the sidewalls of a heat insulating chamber are connected to the second surface.

20. The bed cover of claim 4, wherein the sidewalls of a heat insulating chamber are connected to the second surface.

* * * * *